United States Patent [19]
Bassi et al.

[11] Patent Number: 5,319,645
[45] Date of Patent: Jun. 7, 1994

[54] METHOD FOR DEBUGGING AND TESTING THE CORRECTNESS OF PROGRAMS

[75] Inventors: Flavio Bassi, Vigevano; Lucio Furlani, Milan; John Mason, Rho, all of Italy

[73] Assignee: Bull HN Information Systems Italia S.p.A., Milan, Italy

[21] Appl. No.: 738,064

[22] Filed: Jul. 30, 1991

[30] Foreign Application Priority Data

Aug. 7, 1990 [EP] European Pat. Off. ......... 90830370.4

[51] Int. Cl.$^5$ ............................................. G06F 11/00
[52] U.S. Cl. .................................. 371/19; 364/944.6; 364/945.7; 364/946; 364/267; 364/267.91; 364/267.8; 364/DIG. 1; 364/DIG. 2
[58] Field of Search ............... 371/19, 16.1, 68.3, 371/21.2; 364/200 MS File, 267 MS, 267.91 MS, 267.8 MS, 944.6 MS, 945.7 MS, 946 MS

[56] References Cited

U.S. PATENT DOCUMENTS

| | | | |
|---|---|---|---|
| 3,707,725 | 12/1972 | Dellheim | 371/19 |
| 4,589,068 | 5/1986 | Heinen, Jr. | 364/300 |
| 4,750,110 | 6/1988 | Mothersola et al. | 364/200 |
| 4,811,276 | 3/1989 | Suga | 364/900 |
| 4,859,995 | 8/1989 | Hansen et al. | 340/710 |
| 4,937,036 | 6/1990 | Beard et al. | 340/706 |
| 5,038,348 | 8/1991 | Yoda et al. | 371/19 |
| 5,142,679 | 8/1992 | Owaki et al. | 395/700 |

Primary Examiner—Robert W. Beausoliel, Jr.
Assistant Examiner—Phung My Chung
Attorney, Agent, or Firm—Gary D. Clapp; John S. Solakian

[57] ABSTRACT

Method for debugging and testing the correctness of programs, comprising the loading in a data processing system of a monitoring program, of at least a source program to be testing and of at least an object program achieved by the source program through a preprocessing which includes, at each executable program row, a call to a control routine, in the independent activation of a monitoring process based on the monitoring program and of a process to be tested, based on the object program, the two processes interacting by use of message queues.

3 Claims, 5 Drawing Sheets

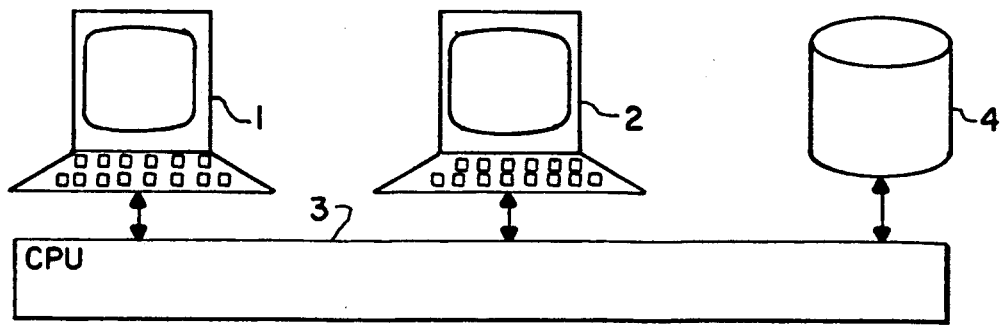
FIG. 1
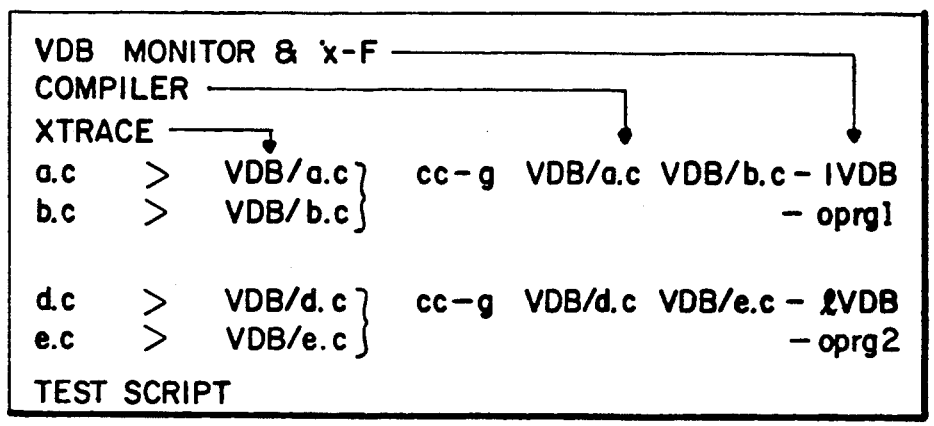
FIG. 2
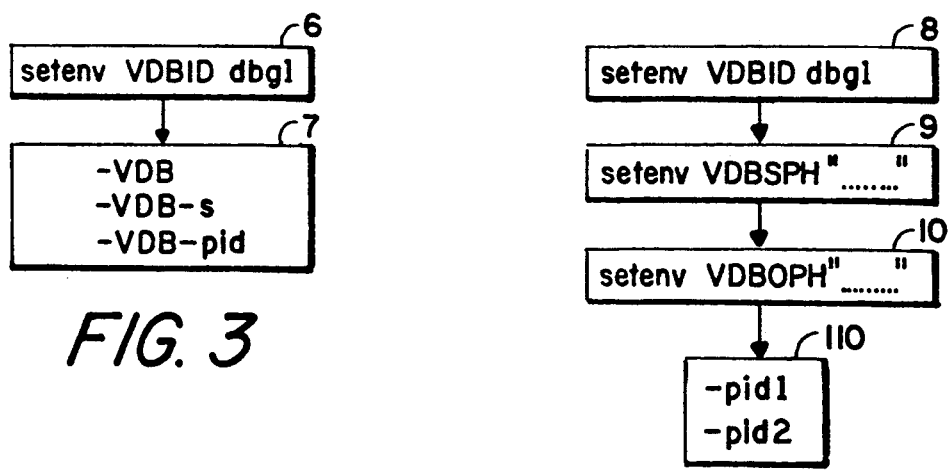
FIG. 3
FIG. 4

METHOD FOR DEBUGGING AND TESTING THE CORRECTNESS OF PROGRAMS

FIELD OF THE INVENTION

The present invention relates to a method for debugging programs and testing programs for correctness.

BACKGROUND OF THE INVENTION

It is known that testing of the correctness of programs for data processing systems is a basic problem in the electronic data processing field. This problem has not been entirely solved, in spite of the several analysis and test tools which have been adopted.

A basic reason for the difficulty in testing the correctness of a program is that the program behavior largely depends on the data on which the program operates and, in case of interactive programs, on the information (data and commands) received from a user. Therefore even if exhaustive testing is impossible, as is often the case, program testing and verification is preferably conducted by causing the program to operate with some data. In other words, by creating and performing what is defined as a "process " by software designers.

A "process" is commonly defined as an address space, a control thread operating within the address space, and the set of system resources needed for operating with such thread. A is therefore a logic entity consisting of the program itself, the data on which it must operate and the memory resources and input output resources required for running the process. Program verification and the detection of errors (bugs) is therefore the execution of the program as a process thread to test if the process develops in the correct way or if undesired or unexpected events occur. To test a process in the course of its running, the proper art offers two basic tools: tracing functions, or tracers and symbolic analysis functions, or symbolic debuggers. The tracing functions modify a program to be tested so that each program instruction is preceded and followed by instructions which control the printing of the instructions and possible variables used by the instructions before and after execution of the instructions.

The symbolic analysis functions are basically interactive programs which, starting from a source program to be tested, which is in a high level language such as the C language and which is treated as a data file, generate a compiled program as an executable copy of the source. The symbolic analysis functions modify the executable copy of the source so that for each source code instruction it performs a routine which, by means of conditional branches to other routines, allows the user to see on a screen the various instruction sequences and to selectively set break points after each instruction of the object program, using a display of the source as a reference.

The symbolic debuggers further allow the insertion in the object program of routines for recording the variables used in execution of the instruction and, on user request, lists of break point lists and used variables, displaying them on a screen and enabling the user to add and remove break points, to modify variables, and to test the program functions in different environments. These tools are particularly effective in that they permit step by step control of the execution of a program, that is, they allow the evolution of the related process to be controlled by halting and restarting the process at will and by changing parameters during the course of execution of the process. The tools also display the execution of the process to the user in detail by means of display windows which allow the user to continuously monitor the process status and which allow the user to control execution of the process through user intelligible indications.

No matter how effective the tools, such tools suffer from severe limitations. First of all they can test and operate on only a single process at a time, and the monitored process is treated as a "child" process of the symbolic analysis function or process. That means that, in the case of more interactive processes, the monitoring can be performed only on single non-active process phases, which have to be obtained by severing the program into segments. Otherwise, it would be necessary to link the various programs so as to generate a single process whose evolution would then be extremely difficult to follow, even at symbolic level.

Further, the process to be tested must be activated by the father process (the symbolic analysis process) and cannot be activated earlier. The debugging of programs which are activated at system start up, such as monitors, daemons, etc., is therefore impossible.

Eventually, since the process to be tested is generated as a child of the symbolic analysis and in a certain sense is the result of a combination of the symbolic analysis function/program with the program to be tested, the two processes must share or utilize the same resources. As a consequence, interactive program which make use of masks and windows and therefore need a terminal cannot be tested because they compete or interfere with the symbolic analyser in requiring access to the display and control terminal.

These limitations are overcome by the method for program debugging and correctness testing which is the object of the present invention.

OBJECTS OF THE INVENTION

It is therefore an object of the present invention to provide an improved method and means for debugging programs and testing programs for correctness.

SUMMARY OF THE INVENTION

According to the present invention, the process or the processes to be tested, identified in following as Processes Under Test (PUTs), are created as processes distinct form the monitoring process or processes. The monitoring processes communicate with the PUTs by means of messages which are stored in a queue of messages addressed to the PUTs and, in return, the various PUTs communicate with the monitoring process or processes by means of messages which are stored in message queues, one for each monitoring process, the messages addressing one of the monitoring processes.

Since the several PUTs have to interact with the monitoring processes by means of queues, the various PUTs are performed, or executed, based on archives, or executable files in object language code, the files being obtained by preprocessing of the source program to be tested. Preprocessing, in addition to performing the obvious compilation from source code to object code, provides for the insertion at each instruction or instruction row of the source program, of an instruction (xx) calling a function or routine (X-F) which has the task of reading the queue of messages sent to the PUTs and to perform a corresponding operation accordingly. X-F further has the task of writing, on the occurrence of certain conditions, suitable messages in the message queue of the monitoring processes.

One of the conditions which the function X-F has to monitor is the presence of a BREAK POINT (BP) before the instruction to be executed. Such break points are set by operator by means of the monitoring processes. Information related to such break points is stored in point tables (BPTABLEs), to which both the monitoring program and the programs to be tested must have access. Such tables must therefore be shared resources.

Since a debugging or test operation implies the generation and running of distinct and intercommunicating processes, simultaneous debugging operations in a multiuser environment require a means for avoiding interference and confusion among users, by identification of differing debugging sessions.

In order to avoid interference in the user-process interaction, the set of monitoring and the set of PUTs each preferably comprise distinct I/O resources (terminals).

In order to have more effective debugging in case of interaction among several processes, and hence the need to test several processes, a "background" monitoring function is provided so as to test several processes in parallel, by prearranging suitable test operations and test conditions.

BRIEF DESCRIPTION OF THE DRAWINGS

The features and the advantages of the invention will appear more clearly from the following description of a preferred form of implementation and from the enclosed drawings where:

FIG. 1 shows the hardware resources essential to the performance of the method of the invention;

FIG. 2 shows the programs or executable files essential to the performance of the method of the invention;

FIG. 3 shows in flow diagram the operations to be performed to start a monitoring process;

FIG. 4 shows in flow diagram the operations to be performed to start a process to be tested (PUT);

DESCRIPTION OF A PREFERRED EMBODIMENT

Figure 5:
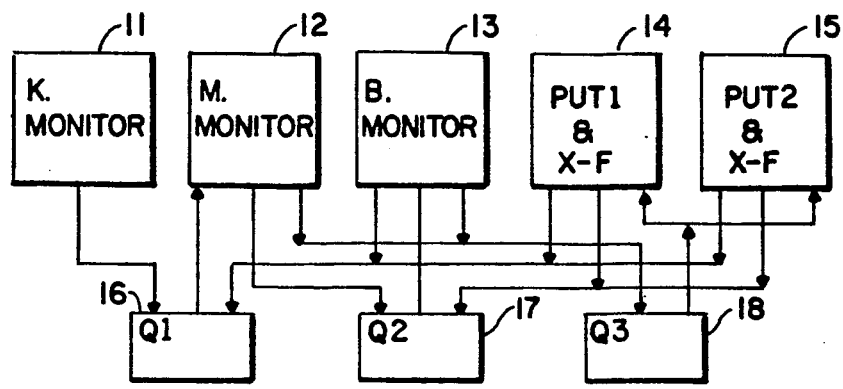
FIG. 5 shows in block diagram the structure of the system for implementing the method of the invention.

FIG. 1 shows the hardware resources needed for performing the method of the present invention. They comprise a display with keyboard 1, a second display with keyboard 2, a central processing unit or CPU3, with related working memory, and a mass storage 4.

For efficient performance of the system it is preferable that the files needed for the generation of the several processes be stored in storage 4. The files are shown in FIG. 2 and include:

a file VDB MONITOR in object format;

a file XTRACE in object format, the file performing the function of modifying a source file to be tested, by incorporating in each row of the source file a call to a function x-F (by "call" it is meant a branch institution which points to a routine performing a predetermined function).

an x-F function file (which may be a VDB MONITOR file);

a COMPILER file for compiling in object format from a source language, for instance the C language;

the generical source files a,b forming a first program to be tested; and test routing (TEST SCRIPT) files which will be considered in the following.

In order that CPU3 and the debugging system may operate on programs a,b and d,e these files must be preprocessed, giving origin to new source files where each instruction (or instruction line) is preceded by a call to the function x-F. By means of any of the terminals 1,2 the operator must control the generation of these files by the commands (in C language):

x trace a.c. VDB/a.c
x trace b.c. VDB/b.c
x trace d.c. VDB/d.c
x trace e.c. VDB/e.c These commands insert the function x-F and the related calling instruction, in the various a,b,d,e files (in C language) and generate new C language files having name VDB/a.c; VDB/b.c; VDB/d.c; VDB/e.c.

In order that CPU3 may operate according to the thread defined by these source files, they must be compiled, that is translated into machine language, by means of the following operator commands:

| cc-g VDB/a.cVDB/b.c | -LVBD -oprg1 |
| cc-g VDB/d.cVDB/e.c. | -LVDB -oprg2 |

By these commands, two machine language executable files having the names prg1 and prg2 are created. They are linked to the library of functions of the VDB monitor. The compilation option $-g$ indicates that the relational symbolic name/address of the program variables must be saved to allow for the retrieval of the variables by means of their symbolic names. All these operations are well known in the art and do not need any additional explanation: it is the contents of the VDB functions which are different. Once these preliminary operations are performed, several file types exist in the storage of the FIG. 1 system: source files and object files. Once the resources required for operation are prearranged it is necessary to start the several programs.

According to one aspect of the invention this is made, in case of interactive programs, by using two distinct terminals. In addition, and in order to enable more users to perform the testing of differing programs at the same time and in the same system, which generally allows for multiuser operation and may have more than two terminals, it is provided that each user will identify its own testing session so as to avoid conflicts and interference with other users. These two aspects are shown by the flow diagrams of FIG. 3 and FIG. 4.

In FIG. 3 the user who wants to open a testing session defines a testing environment VDBID by identifying, with a name "dbg1," its own environment. This is done by the command setenv BDIB dbg1 (block 6). The user then activates the analysis function (block 7), which is referenced by its own name followed by one of several possible options which establish differing operative modes:

| | |
|---|---|
| - VDB | or |
| -VDB −2 | or |
| - VDB -pid. | |

The commands shown in the flow diagram of FIG. 3 and related to the monitoring function VDB must be given through terminal 1, which becomes the terminal through which the monitoring function communicates the status of the process under test to the user.

In FIG. 4 the user who intends to test a program defines the analysis environment VDBID in which the program is to be monitored by means of the command setenv VDBID dbg1 (block 8).

The user must further provide the information needed to retrieve the object files to be executed and monitored and the related source files by means of the commands:

setenv VDBSPH "source-file path-name" (block 9) and setenv VDBOPH "path-name-object-file" (block 10).

Then the user may start the execution of the object file with the commands -pid1; -pid2 (block 110). The commands shown in the flow diagram of FIG. 4 and related to the activation of the processes to be tested are preferably given through terminal 2, which becomes the terminal through which the programs described by files pid1, pid2 may interact with the user. The activation of the monitoring function is independent of the activation of the programs/processes to be tested and may proceed or follow the second, at will. This is possible because the monitoring function VDB is a process distinct from those which are generated by the execution of the programs to be tested and because the monitoring VDB and the function x-F included in or called at by the executable files provide the required synchronization between the two kinds of processes.

FIGS. 5 shows in block diagram the structure of the system for performing the method in accordance with the invention. The showing is in terms of generated processes.

The monitoring program VDB comprises three distinct modules; a keyboard monitor, a main monitor, and a background monitor. When the VDB program is activated, three distinct processes 11,12,13 are created, respectively for controlling the keyboard, for a main monitoring of the process, for a background monitoring. Even if the three processes may constitute a single process, the severing into a main monitoring process and background process is of advantage because it enables the user to simultaneously operate with differing modalities on a plurality of processes to be tested. The severing of the keyboard controlling process from the other processes is advantageous because the communication mechanism among differing tasks is made homogenous and the need for branches from message queue monitoring to the monitoring of other conditions is avoided. It further provides, in a systematic way, compliance with the first in/first serviced criterion in treating the various messages. Likewise, when the programs referenced by pid1, pid2 are started, two distinct processes 14,15 referenced as PUT1,PUT2 are created or activated each comprising the function x-F.

The generation of the monitoring processes is completely useless if they cannot interact with the processes to be monitored. This interaction is possible and is made through the exchange of signaling messages among processes. The exchange is performed with the use of a predetermined memory space where to store an ordered sequence of messages. Thus three memory spaces 16,17,18, respectively named queue Q1, queue Q2, queue 3, are respectively associated to the main monitor 12, to the background monitor 13, and to the set of processes to be tested 14,15. Other processes may store messages to process 12 in queue Q1, messages to process 13 in queue Q2 and messages to one of the processes 14,15 in queue Q3. The memory regions 16,17,18 form a shared memory segment which is created and allocated with the activation of any of the various processes.

A basic function of process 12 (main monitor) is the one to manage (insert, remove) break points which stop the execution of a process to be tested at predetermined points, that is at predetermined instruction lines of the program executed by the process. On the other hand, the function x-F in the process to be tested has the task of detecting the presence or absence of break points. It is therefore necessary to allocate in the shared memory space some regions to store tables, one for each process to be tested, to store descriptions of the situation of the break points for each process. These tables are basically lists of absolute addresses of instructions in the source files, progressively numbered and in correspondence to break points which have been set.

In addition to these tables, a buffer is provided (25 in FIG. 6) in the shared memory space to store certain information, such as the active inactive state of the monitoring process, the activation option -s, -pid, other commands, dynamically generated at run time, such as for instance a command A (general stop of all processes to be tested) and lists of processes under test.

Figure 6:
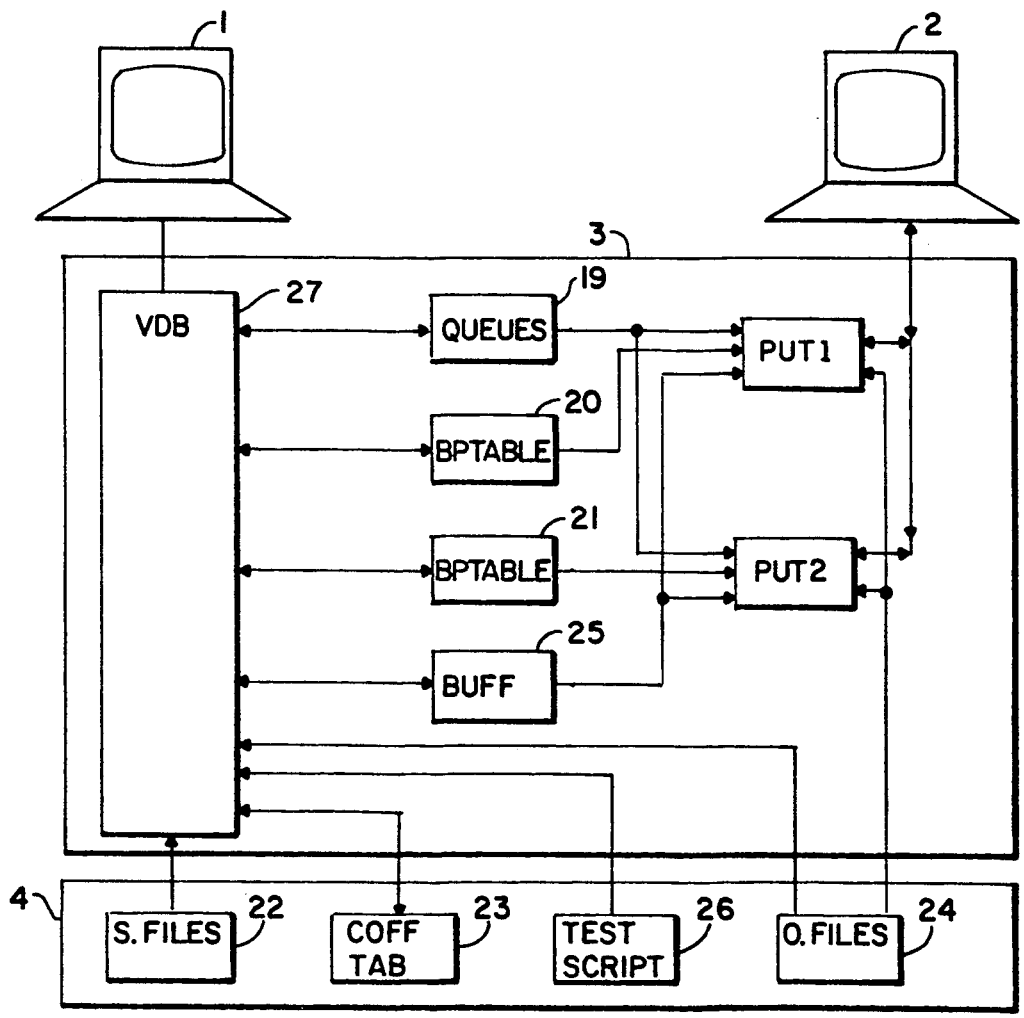
FIG. 6 shows in block diagram the logical and hardware resources used in performing the method of the invention.

FIG. 6 shown in block diagram the structure of the monitoring system in terms of resources. Terminal 1 receives, from VDB monitor 27, and stores in the working memory of CPU3, information on the status of the PUTs based on several inputs, such as information contained in status buffer 25, messages stored in the set of queues 19, a break point list stored in tables BPTABLE 20,21 source files 22 and object files 24 (stored in mass memory 4 and moved into the working memory by pages at the extent they are needed), COFF tables 23 (for Common Object File Format), and tables which describe the format of the several files and hence the features of the used variables and the relation symbolic name-address. The COFF tables are stored in the mass memory 4 and moved to the working memory when and to the extent they are needed. The processes to be tested PUT1, PUT2, in turn, operate on the basis of the object files 24 moved from mass storage to working memory and on information read out from queues 129 and from break point tables 20,21, and further, in case of user interactive processes, on the basis of signals sent to and received from terminal 2.

Test routines, or TEST SCRIPT 26, to be performed on a process under test must be provided, compiled, loaded in the mass storage and moved in working memory when required, in order to perform a background monitoring of processes under test.

Before discussing in further detail which operations are performed by the monitoring processes and by the function X-F in the process under test PUT, it is advisable to briefly consider what the user needs from the monitoring system and what the system provides, in a context where more processes to e tested are active. Basically the user needs some means to visualize, in a clearly interpretable form, at which point of a program the processes to be tested are at. The user also needs some means to stop the processes under test, either after each instruction line has been executed or after predetermined instructions have been executed. He further needs to know the value of variables used in the processes, and to be able to modify the variables. Eventually, he needs to know the status of the various processes under test. All these items of information are requested by the user through the keyboard and are displayed at the terminal screen by the main monitor through a plurality of "windows" which the user calls with suitable commands.

When the monitoring process is started, the user receives a first confirmation message on the terminal display:

"The VDB monitor is active"

no processes under test are active As soon as a process under test is started the user receives the following message on the terminal screen:

"A process having identifier pid has been started" The terminal screen further displays the list of the first lines of the source file corresponding to the process in execution. Then the user may begin to navigate among the available information items, selecting source lines, setting and removing break points, reading or writing variables and so on, controlling step by step the execution of the process, and so on. The starting of other processes to be tested (or, if previously started, as soon as they notify their presence to the main monitor) is signalled on the screen with a message in a predetermined line of the screen. The remaining portion of the screen continues to display the previous image unchanged and provides information on the first PUT which has been started.

It is the user who decides what he wants to see and the user may control a change in the visualization of information related to a given process, which is defined as the current process, to the visualization of information related to another process, which becomes the current process, or to the visualization of tables which list the various started processes and their status, so as to select, among them, the process to be visualized, which accordingly is to be the current process. All these details are provided to select the messages and the operations which the monitoring processes have to generate and to manage.

Figure 7:
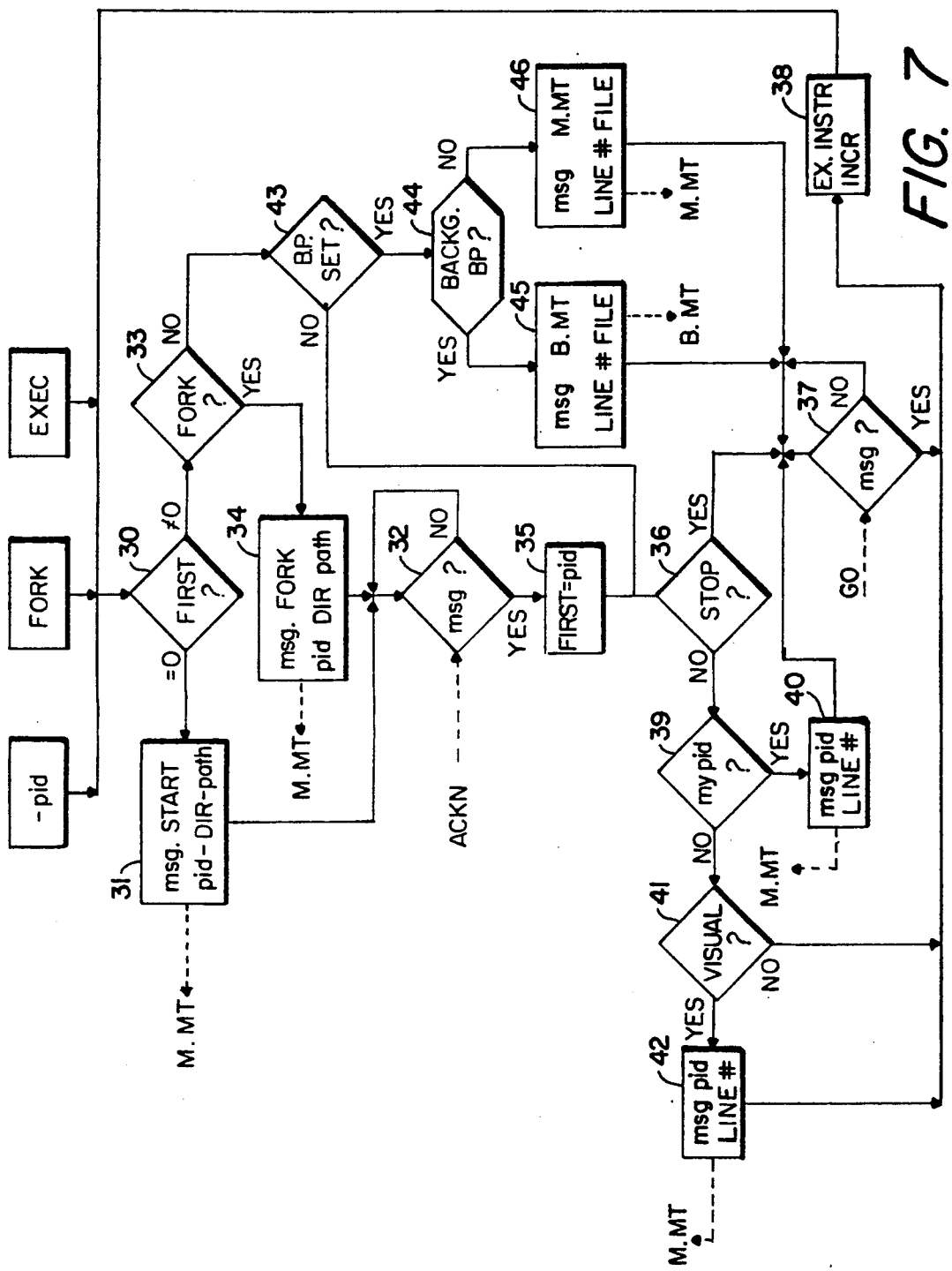
FIG. 7 shows in flow diagram the essential operations performed by a control function x-F used in the method of the invention.

Basically, the keyboard is the instrument by which the user sends commands which are converted, by a keyboard monitoring process, into messages sent to queue Q1 of the main monitoring process. FIG. 7 shows, in flow diagram, the operations performed by the function x-F in the process under test (PUT). Function x-F is triggered before executing each instruction line of each PUT by the first instruction xx found in each line. A generic process PUT identified by an identifier "pid" may be generated and activated in several ways:

a) with an explicit command -pid b) with the execution of the primitive FORK by a "father" process for generating a "child" process having the same identifier; or c) with the execution of the primitive EXEC by which the process switches from the execution of one file to the execution of another file, without changing its process identify.

All of these events address an instruction line for its execution and therefore first call for the function x-F. Function x-F has, among other tasks, the one of detecting and signalling these events to the main monitoring process or main monitor. Function x-F detects one of these events by testing (block 30) the value of a static variable FIRST which is set to zero by the operating system when the process is created and subsequently set to a value equal to the process identifier pid. If FIRST is 0 the event which has started the functions is a process activation or an EXEC primitive. Therefore a message is sent (block 31) to the main monitor M.MT indicating that a process identified by a pid, and whose files are retrievable in a directory "DIR" through a "path" has been started (START). Based on this information the main monitor may detect if the started process is a new one (new pid) or is a process already under test. Function x-F then waits for a reply message from the main monitor. The message is read in the message queue (block 32). if FIRST is other than 0, the function x-F checks (block 33) if the new process results from a FORK primitive. If the check is negative, the function x-F has been called by the instruction xx heading a new instruction line of an already running process and function x-F steps from block 33 to a block 43 which will be considered in the following. If the event which has started the x-F function is a FORK primitive, the function forwards a message to the main monitor (block 34) indicating that the FORK is related to a process defined by a pid having files retrievable in a directory "DIR" through a "path". Even in this case the function x-F, once sent the message, waits for a reply message and steps to block 32. On receipt of these messages, the processes which have signalled their presence, updates a list of processes under test, display the event on the terminal screen and forwards to the activated process a reply message ACKN, indicating the location of the BPTABLE where to check the presence of break points, and the location of a buffer 25 where to check the status of certain commands such as -s, -pid, A. The options -s (in the command which has started the monitoring process) indicates that the processes which have signalled their presence may proceed, except the process which is identified by pid. This process must wait for an explicit consent and becomes the current process under test. Command A is a STOP command which may be set and reset at "run time" and requests the halting of all processes under test. When the reply message is received from the main monitor, the function x-F restarts. It sets the FIRST variable equal to its own pid (block 35) and check if stop commands (-s,A) are present (block 36). If present, the function x-F waits for an explicit GO message (block 37) on receipt of which the function x-F ends and the process under test proceeds with the execution of the subsequent instruction (or instructions) of the same row (block 38) and the referencing of a new instruction row, with the consequent reactivation of the x-F function. If no STOP command is present but the process under test has the same pid of the activation option (block 39), the function x-F sends a message to the main monitor specifying its own pid and the line number LINE where the process under test is haled (block 40).

X-F then steps to block 37. It is a task of the main monitor to display the status of the process under test, which becomes the current one. If the pid identifier is different, the function x-F checks in the buffer if a condition VISUAL is set (block 41). If this condition is asserted, it sends a message to the main monitor, specifying the line number LINE of the process under test (block 42) and terminates, allowing the process to proceed with the execution of the further instructions of the same row (block 38). If the VISUAL condition is deasserted, the function x-F ends and the process steps from block 31 to block 38. If the function x-F is started in the course of an already active process (block 33, FORK condition false) the function steps from block 33 to block 43 and checks, by reading the break point table B.P.TABLE related to the process if a break point has been set for the current instruction row (B.P. SET?). In the negative case, the x-F function steps from block 43 to block 36 already considered and it is further checked (STOP?) if the test conditions anyhow require a stop or a step by step running. In the affirmative case (B.P. SET) the function x-F checks (block 44) if the break point is of background type. If it is of background type, a message is sent to the background monitor (msg B.MT) and the line number and file number where the process has been stopped is sent (block 45). The function x-F then waits for a reply message stepping to block 37 already considered. If the break point is not of background type, a message is sent to the main monitor (msg.M.MT) specifying the line number and file where the process is stopped (block 46) and the function x-F steps to block 37 waiting for a reply message in order to proceed.

Figure 8:
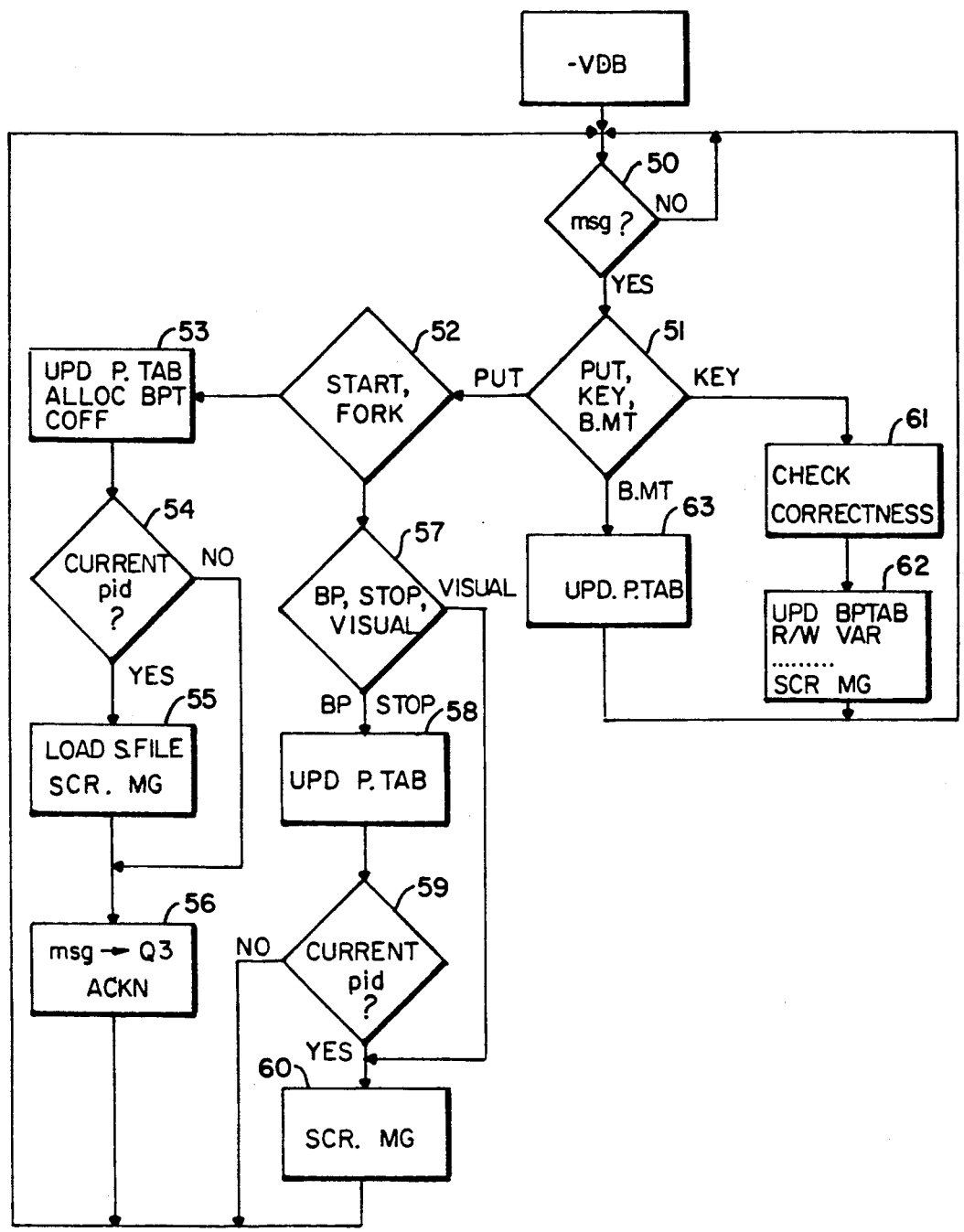
FIG. 8 shows in flow diagram the main functions performed by a control process (main monitor) in the method of the invention; and, FIG. 9 shows in flow diagram the main functions performed by another control process (background monitor) in the method of the invention.

FIG 8 shows in flow diagram the basic operations performed by the main monitor M.MT. Basically, the main monitor has to manage the interaction of the x-F function of all processes under test and the user interactions through terminal screen and keyboard monitor. The typical activity of the main monitor is therefore to check for the presence of a message addressed to it, to recognize the contents of the message and provide accordingly with a continuous recycling. One the main monitoring process is started (VDB command) the main monitor checks the presence of messages in the queue Q1 (block 50). When a message is received, the main monitor tests if the message has been sent by a process under test PUT, by keyboard, or by the background monitor (block 51). If the message is originated by a PUT, it is first checked (block 52) if it is a START or a FORK message (blocks 31,34 of FIG. 7). In the affirmative case, the list of processes under test is updated (UPD P.TAB) by adding the new process to the list, if not already present, by allocating a break point table (ALLOC BPT) for the new process and building, loading or copying in working memory the required COFF tables (block 53). Once these operations are performed, the main monitor tests if the message has been originated by a process identified as the current one (block 54) and in the affirmative the related source file is loaded in working memory (LOAD S. FILE), if not already present and suitable commands (SCR.MG) are sent to the screen to display the event (block 55). Then a confirmation message ACKN is sent to the message queue 03 of the processes under test (block 56) and the main monitor returns to block 50. In the negative case the main monitor steps from block 54 to block 56. If the received message is not a START or a FORK message, it is tested if the message has been originated by a break point, or stop, or a VISUAL condition (block 57). In the case of break point BP or STOP detected, the process table is updated (UPD P.TAB, block 58) by recording the state taken by the process under test and the row where the process has been stopped. In addition, if the process originating the message is the current one (block 59) suitable commands are sent to the terminal screen to display the event (block 60). The main monitor then returns to block 50.

In case the message sent by the process under test is due to the condition VISUAL asserted, the main monitor steps to block 60. The case is now considered in which the message received by the main monitor has been sent by the control keyboard. In this case the monitor steps from block 51 to block 61. The main monitor checks for the correctness of the received commands which may request the execution of some basic operation:

to see the status of the processes under test, to select a generic process under test as current process, to see the list of break points which have been set for a generic process, to insert or remove break points in or from the break point list of a current process, to read or write process variables, or to start a stopped process.

Once the correctness of a process has been verified, the main monitor performs the required operations (block 62) and provide a corresponding displaying on the screen. The main monitor then returns to block 50. The main monitor may further receive messages from background monitor. By these messages the background monitor, which will be described in the following, signals possible changes in the status of processes which have been controlled in background. The only function which the main monitor has to perform, on receipt of such message is therefore to update the status of the process table P.TAB (block 63). This is mandatory because the main monitor records (for referring to the user on command by keyboard) the status of all processes under test. Once the process table is updated, the main monitor returns to block 50.

Figure 9:
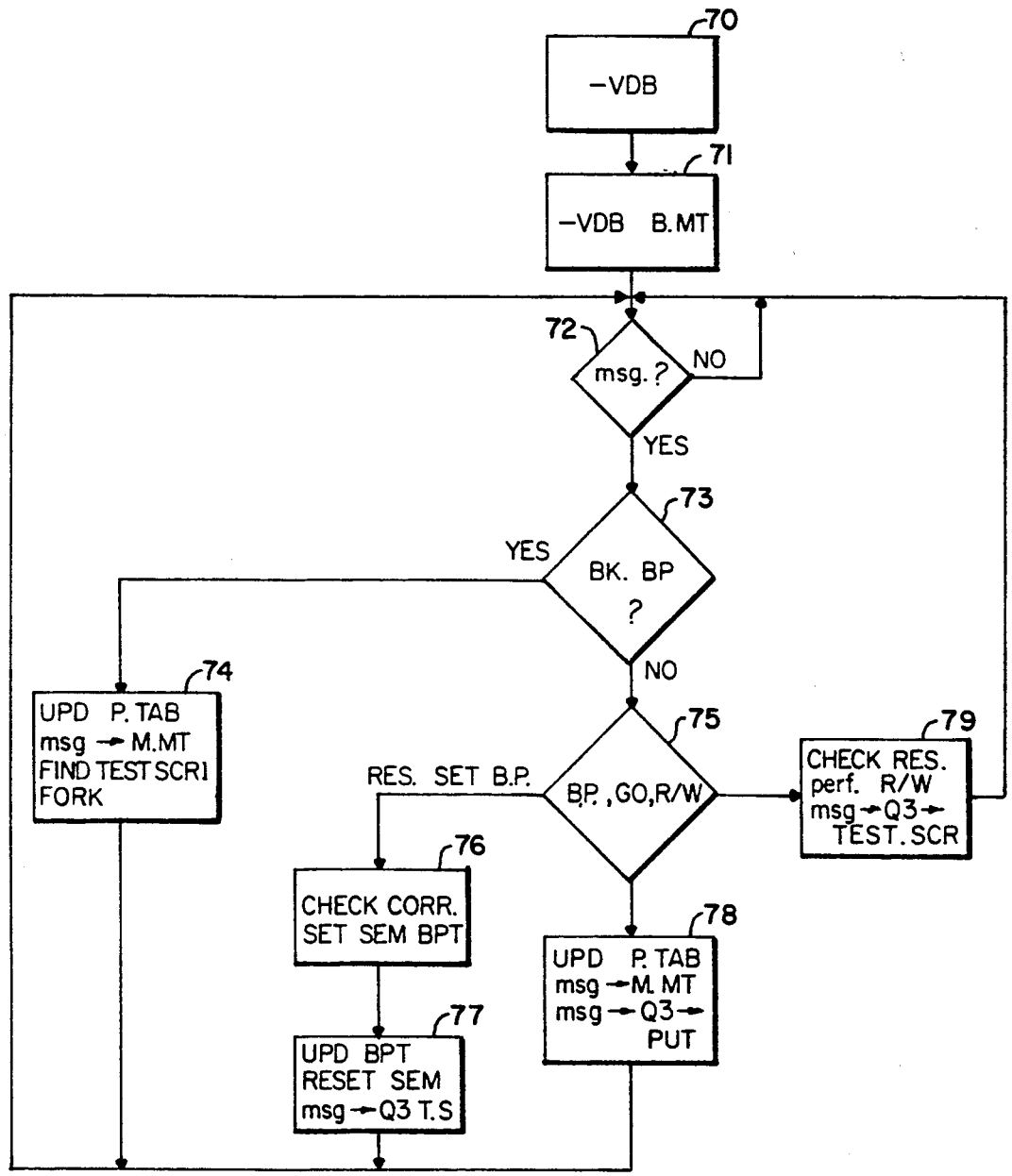

FIG. 9 shows in flow diagram the operations performed by the background monitor. While the main monitor, as already seen, has the task to signal to operator the status of the current process, but cannot, restart stopped processes on its own initiative, perform read or write operation on a variable and more generally test operations on programs to be tested, the background monitor is provided purportely for performing these tasks, without need of the operator intervention. The user may preset, before starting the monitoring processes, or dynamically in the course of the processes, some test routine or TEST SCRIPT. These routines are selectively activated, generating a testing process each time the function x-F detects a background break point in the course of a process under test. The background monitor is invoked and automatically activated by the activation of the VDB monitor (blocks 70,71) and the background monitor checks if there are messages in the queue Q2. If a message is present (block 72) the background monitor tests if the message is due to the detection of a background break point or not (block 73). In the affirmative case the background monitor updates the status of its process table (the background monitor manages its own process table where the only processes are recorded for which a background breakpoint has been detected), thin it sends a message to the main monitor (the main monitor too has to update the status of its process table), identifies a test routine (FIND TEST SCR.) related to the break point and referenced by a code (FLAG) in the break point table and generates a "child" test process with the FORK primitive. The child process may insert, remove brake points, read or write variable and restart the process under test. Once these operations are performed (block 74) the background monitor steps to block 72 to test the presence of the other messages in Q2. If the received messages is not due to a breakpoint, it is due to a child testing process which requests the execution of some of the already indicated operations. Therefore the background monitor steps from block 72 to block 75 and recognizes the operation to be performed. If the insertion or removal of a breakpoint is requested, the background monitor steps from block 75 to block 76. The correctness of the request is verified and a semaphore is a set (SET SEM BPT) to prevent break point table access interference by the main monitor. The break point table (BPTABLE is then updated with the insertion/removal of the break point and the semaphore is reset. Eventually an operation completed message is sent in queue 03 to the testing process TEST SCRIPT (block 77). From block 77 the background monitor returns to block 72. If the message received by the background monitor (from a testing process) requests the restart of the PUT for which the testing process has been performed, the background monitor steps from block 72 to block 73, then to block 75 and to block 78. In block 78 the background monitor updates its process table, sends a message to the main monitor to have the main monitor process table updated and sends a message to queue Q3 in order that the process under test (thanks to the function x-F) can restart. From block 78 the background monitor then returns to block 72. If the message received by the background monitor requests the reading or writing of a variable, the background monitors steps from blocks 72,73,75 to block 79. The existence and consistency of the needed resources is first tested. Then the operations performed and a message is sent to the testing process (msg>Q3>TEST.SCR) through queue Q3. Even in this case, the background monitor returns from block 79 to block 72. The preceding description is related to a preferred embodiment of the tools used for performing the method of the invention. It is, however, clear that several changes can be made without departing from the scope of the invention. For example, in case the processes under test are not interactive with the user, a second terminal for their starting is not required. Likewise the partitioning of the monitor program in modules and its activation as a plurality of distinct processes is only a preferred way of implementation and the monitor program may constitute a single executable file. Even the reprocessing of a source program to be tested and its compilation may be performed "off line" provided the preprocessed and compiled program is loaded in the system used for performing the method. The use of the C-language is given by way of example and the method may be used with any language and any operating system capable of managing multiprocessing systems.

Therefore, while the invention has been particularly shown and described with reference to a preferred embodiment of the apparatus thereof, it will be understood by those of ordinary skill in the art that various changes in form, details and implementation may be therein without departing from the spirit and scope of the invention as defined by the appended claims.

What is claimed is:

1. A method for debugging and testing the correctness of programs with a data processing system provided with at least a first user terminal having display and keyboard and a storage storing a monitoring program, a source program which must be debugged and tested, the source program comprising a plurality of executable instruction rows, and an object program, said object program being generated from said source program by a preprocessing operation which includes in said source program, at each executable row, a call to a control routine, comprising the steps of:

activating through said first user terminal first monitoring process based on said monitoring program, and activating a second process executing said object program, said activations occurring in any order, signaling by said second process to said first monitoring process by means of a first message stored in a first message queue the occurrence of the activation of said second process, detecting said first message by said first monitoring process and signalling to said second process with a second message, stored in a second message queue, modes to be followed in the further processing of said second process, wherein said monitoring program comprises a main module and a background module, the activation of said first monitoring process comprising the steps of activating a main monitor process and the further step of activating a background monitor process, said main monitor and background monitor communicating each with the other and with said second process by means of said first message queue, a third message queue and said second message queue, said queues being respectively related to said main monitor, said background monitor and said second process, and wherein said storage stores a test routine (TEST SCRIPT) which must be performed at a predetermined point of said second process, further comprising the steps of identifying said predetermined point, by means of a background break point referring to said test routine in a break point table accessible for read/write operations by said main monitor and background monitor and accessible for read operation by aid second process, detecting by said second process said background break point, and forwarding a message to said background monitor, upon detection of said background break point, and generating and activating by said background monitor a child testing process, based on said test routine referred to by said background break point.

2. The method for debugging and testing the correctness of programs of claim 1, wherein said data processing system is provided with a second user terminal having display and keyboard, the activation of said second process being performed through said second terminal.

3. The method for debugging and testing the correctness of the programs of claim 2, said storage storing at least a second source program to be debugged and tested, and at least a second object program generated from said second source program by a preprocessing which includes at each executable row of said second source program, a call to a control routine, further comprising the steps of:

activating a third process executing said third object program,
signaling by said third process to said first process, by means of a third message stored in said first message queue of the occurred activation of said third process, and detecting said third message by said first process and signaling to said third process, with a fourth message stored in said second message queue, modes to be followed in the further proceeding of said third process.

* * * * *